Feb. 20, 1940.  A. P. DE SEVERSKY  2,191,342
AIRCRAFT WING
Original Filed Sept. 17, 1936   2 Sheets-Sheet 1
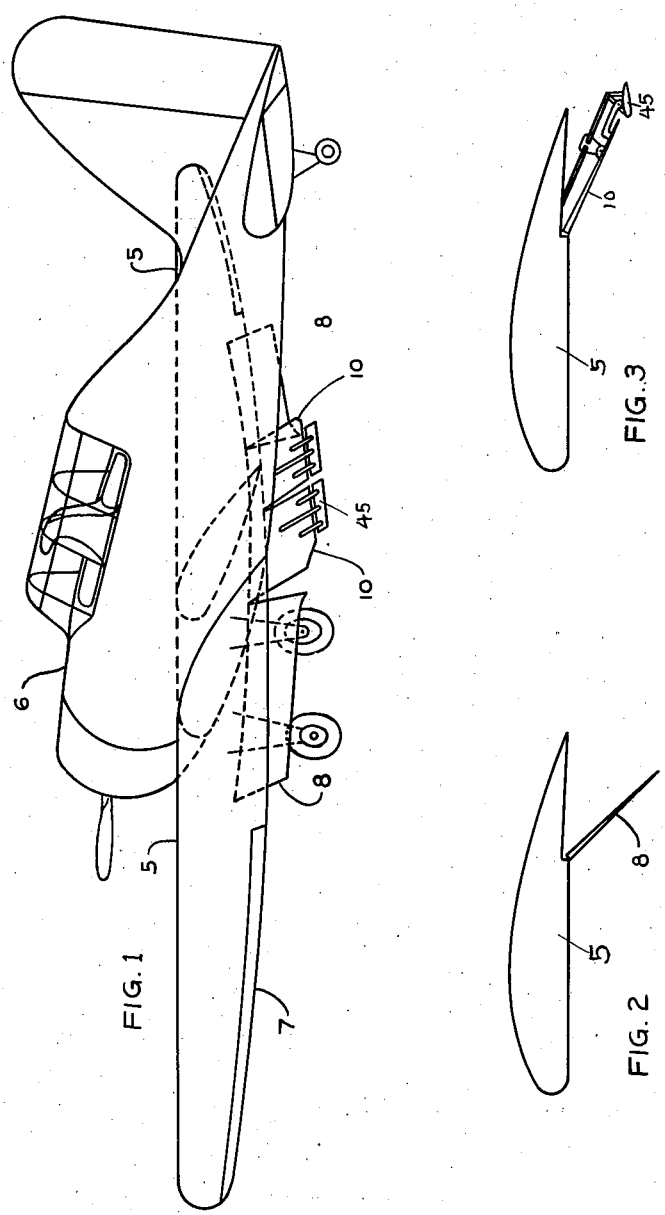
INVENTOR.
Alexander P de Seversky
BY
Hammond & Littell
ATTORNEYS Feb. 20, 1940.  A. P. DE SEVERSKY  2,191,342
AIRCRAFT WING
Original Filed Sept. 17, 1936  2 Sheets-Sheet 2
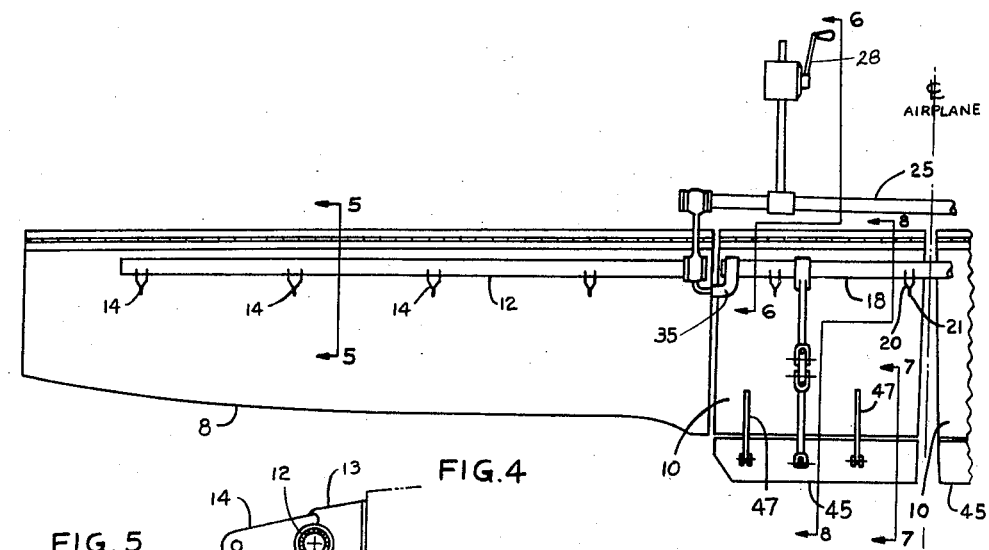
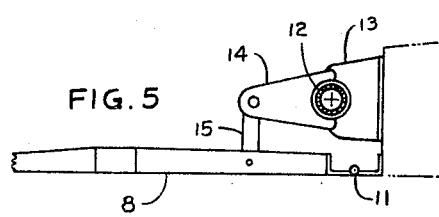
FIG. 4
FIG. 5
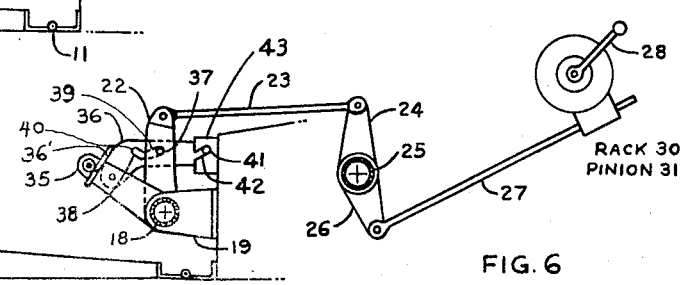
FIG. 6
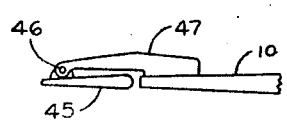
FIG. 7
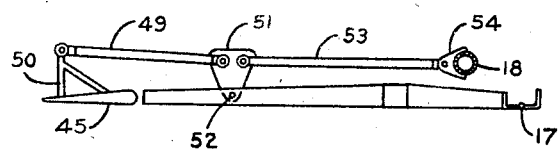
FIG. 8
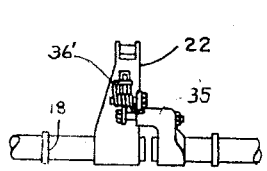
FIG. 9
INVENTOR.
BY  Alexander P. de Seversky
Hammond & Littell
ATTORNEYS Patented Feb. 20, 1940

2,191,342

UNITED STATES PATENT OFFICE 2,191,342

AIRCRAFT WING

Alexander P. de Seversky, Northport, N. Y., assignor to Seversky Aircraft Corporation, a corporation of Delaware Application September 17, 1936, Serial No. 101,243
Renewed June 24, 1939

5 Claims. (Cl. 244—42)

The present invention relates to aircraft and has for an object to make improved provision for intensifying at will the lift of the wings when flying at low speed, especially under the conditions of taking off and landing.

The invention aims also to provide an arrangement for increasing the drag when landing.

One of the problems involved in the construction and use of aeroplanes, particularly high speed aeroplanes is concerned with obtaining the necessary lift at the low speeds of taking off and landing. For obvious reasons it is desirable to be able to rise and land an aeroplane while flying at as low a speed as possible. There is the serious difficulty when landing that if the pilot attempts to reduce the speed of the craft below a certain minimum depending upon the design and size of the wings as compared with the weight of the craft, the lift of the wings is insufficient to prevent crashing. Within certain limits the lift of the wings can be increased by increasing the angle of attack, but when the angle exceeds a certain limit depending upon the design, the lift of the wing decreases very rapidly due to turbulence of the air above the wing. This angle varies from 12 to 20 degrees, depending upon whether or not the flap is used and on what type of airfoil is used.

Furthermore when landing on the ground there is a limit to the reduction of speed that is safely obtainable by brakes operating on the wheels of the landing gear. It is desirable, therefore, to provide an increase of wind resistance.

The present invention provides a wing structure having flaps arranged at the trailing edge of the wing structure adapted to flex downwardly under control of the pilot to increase the camber of the lower surface of the wings. In the preferred arrangement to be more particularly illustrated separate flaps are provided and arranged to be separately operated.

One pair of flaps is arranged directly beneath the fuselage. These add relatively little to the lift while adding considerably to the drag especially when taking off when the propeller is creating a very strong air current beneath the plane. Two more flaps are arranged at the trailing edges of the wings laterally of the fuselage and add proportionately more to the lift but have less effect in increasing the drag. Accordingly a control is provided whereby the side flaps may be operated independently of the flap or flaps directly beneath the fuselage and the central flaps can be additionally operated, or independently operated if desired, in a manner to increase the drag and to some extent also the lift when landing.

The invention has been developed more particularly in connection with the design of a monoplane, although obviously adaptable to other craft, and for convenience such an aeroplane will be described for the purposes of illustration, it being understood, however, that the particular construction is illustrative merely.

The invention will be better understood from a consideration of a particular illustrative embodiment for the purposes of which description reference should be had to the accompanying drawings forming a part hereof and in which—

Figure 1 is a perspective view of an aeroplane in flight showing the lift increasing and drag increasing flaps flexed downward as in landing, Fig. 2 is a sectional view taken substantially on the line 2—2 of Fig. 1 showing one of the side flaps, Fig. 3 is a sectional view taken substantially on the line 3—3 of Fig. 1 showing the central flap in its lower flexed position and showing the auxiliary air-stream deflecting flap in substantially horizontal position, Fig. 4 is a detail view partly in plan and partly in horizontal section through the wing and fuselage showing the flap and flap operating mechanism, Figs. 5, 6, 7 and 8 are detail views taken respectively on the lines 5—5, 6—6, 7—7 and 8—8 of Fig. 4, Fig. 9 is a detail view of the flap flexing mechanism.

The aeroplane shown in the drawings for the purposes of illustration is a monoplane having a wing structure which is substantially continuous with the lower surface of the fuselage. The wings 5 are shown secured to the fuselage 6 and forming a continuous structure substantially flush with the lower surface of the fuselage. As indicated, the wings are provided with the usual ailerons 7. Closer to the fuselage are provided, at the trailing edge of either wing, flaps 8 arranged to be flexed downward as indicated especially in Fig. 1 to increase the camber of the lower surface of the wings. As best shown in Fig. 2, these flaps constitute continuations of the lower surfaces of the wings but are entirely independent of the upper surfaces; that is to say, in the structure shown, and preferably, they are different in structure from ailerons in that when flexed downward they affect the effective camber of the lower wing surface without modifying the upper wing surface.

Centrally of the wing structure and beneath the fuselage additional flaps 10 are provided. The outer flaps 8 and the central flaps 10 are arranged to be operated independently of each other. One reason for such preferred arrangement is found in the fact that when the propeller is in action as when taking off, a strong air current or slip stream caused by the propeller flows immediately beneath the fuselage and it is not desirable to have the flaps 10 in their lowermost position, whereas when landing with the engine shut off and the propeller substantially ineffective, the flaps 10 may be flexed to their downward position advantageously. For aerodynamic reasons the flaps 8 extending along the trailing edges of the wings to the sides of the fuselage, when flexed downward, considerably increase the lift of the wings because of the increase of the camber of the lower surfaces without adding too much to the drag, whereas the flaps 10, if flexed downward during the take-off, would add too much to the drag in proportion to the effective increase of the lift. When landing both the flaps 8 and the flaps 10 increase the lift and the increase of drag is desirable rather than undesirable. The operating arrangements for flexing the flaps downward and restoring them to normal position is best shown in Figs. 4 and 6. The flaps are all hinged to the wing structure. As shown, in Figs. 4 and 5, the flaps 8 are hinged at 11 to the wings 5 and their position is controlled by similar torque tubes 12. These tubes are mounted in brackets 13 secured to the wing structure and are connected by arms 14 and links 15 with the flap 8 at several points in order to apply the necessary operating force to the flaps without causing undue twisting strains. It is to be noted that the torque tubes 12 and the principal connecting mechanism is located preferably within the wing structure or within the fuselage so as not to increase the air resistance. The center flaps 10 are also pivoted to the wing structure as indicated at 17 in Fig. 8. The flaps 10 are shown as two substantially independent members to permit mounting on hinges which are at a slight angle to each other but obviously there is no controlling reason why the two flaps should not be formed as one integral structure if desired. The flaps 10 are both operated by a single torque tube 18 carried on brackets 19 secured to the wing or fuselage structure and operatively connected to the flaps 10 by arms 20 and links 21 similar to the arm and link arrangement 14, 15 of Fig. 5. The slight angularity of the hinge axes can be sufficiently compensated for by adjusting the lengths of the arms 20 and the points of attachment of the links 21. The torque tubes 12 and 18 can be operated independently or inter-dependently by any suitable arrangement. In the particular structure shown, it is desired to so connect the three torque tubes that the flaps 8 are flexed downward simultaneously by the first movement of the operating mechanism and the flaps 10 are later moved downward simultaneously with the flaps 8 after the flaps 8 have moved through an angle of about 15°. An illustrative arrangement for accomplishing this movement is shown especially in Figs. 4 and 6. An arm 22 is rigidly secured to each torque tube 12 and is connected by a link 23 to an arm 24 secured on the rock shaft or torque tube 25 to be operated thereby. The connections between the operating rock shaft 25 and the two torque tubes 12 are similar and only one need be described. The rock shaft 25 is connected through an arm 26, rigid thereon, and a link 27 to be operated by a crank 28. The gearing connecting the crank 28 with the link 27 may comprise a rack 30 with a pinion 31 and if desired planetary gearing or other gearing may be introduced between the crank and pinion to increase the power.

The torque tube 18 controlling the flaps 10 is operated by an arm 35 rigidly secured to the tube through a cam plate link 36 pivotly connected to arm 35. A pin 37 carried by the arm 22 operates in a slot 38 in said link. During the first part of the movement of the arm 22 from its normal position when the flaps are closed the pin 37 rides idly in an arcuate portion 39 of the slot. When the arm 22 and the torque tube 12 have moved through an angle of about 15°, the pin 37 engages an angular portion 40 of the slot and the link 36 is moved downward by further movement of the arm 22 to disengage the pin 41 from the oblique slot 42 in the fixed bracket 43 and thereafter the arm 35 and the torque tube 18 to which it is secured move with the arm 22 and torque tube 12. During the reverse movement of the arm 22, that is to say movement to the right in Fig. 6, the two torque tubes are moved together until the pin 41 engages the slot 42 and the cam link 36 is swung to its locked position. When the cam link reaches this position, the center flaps 10 are in closed position and further movement closes the flaps 8.

The shape of the slot 38 and the arrangement of parts may vary somewhat and yet effect the above operation. The arcuate portion 39 is formed on an arc about the center of the torque tube 18 in order to permit the idle relative movement desired as above mentioned and the angular portion 40 is of such shape that the movement of the pin 37 against the lower surface of the slot will readily force the link downward to move the pin 41 downward and out of the slot 42. The upper surface of the portion 40 of the slot lies at such an angle, substantially perpendicular to the radius from the pivot point of the link 36, that upon movement of the arm 22 in the opposite direction the pin 37 will not slip from its operative lifting position. A spring 36' may be carried by the arm 35 and arranged to urge the link 36 downward to aid the operation described.

Under certain conditions of operation, as for example when the engine is running causing a strong current of air to pass rearwardly beneath the fuselage, there may be a considerable resistance to the deflecting of the flap 10 downward. In order to overcome this resistance and to facilitate the operation the flaps are provided with trailing blades or tabs 45 and suitable connected links are arranged to tilt these tabs to an angle as indicated in Fig. 3, such that the air flow will provide a pressure thereagainst which will exert a pressure downward on the flaps 10. This arrangement is best shown in Figs. 4, 7 and 8. As shown, the tabs 45 are pivoted at 46 to brackets 47 rigidly secured to the flaps 10. The tabs 45 are moved about the supporting pivots 46 by a link mechanism comprising the link 49 connected to a bracket 50 on the tab 45 and connected at its other end to a rocking plate 51 pivoted to the flap 10 at 52. A second link 53 connects the plate 51 to an arm 54 on the torque tube 18. When the flap 10 moves downward about the pivot 17 as the result of the rocking of the torque tube 18, the forward edge of the tab 45 will move downward far enough so that the current of air along the lower surface of the flap 10 will engage the upper surface of the tab 45 and exert the desired pressure thereon. The tabs may be streamlined as shown in the drawings.

This arrangement designed specifically to make it easy for the pilot to flex the flap 10 downward obviously is adaptable for use on other structures such as ailerons, rudders and the like. In addition to accomplishing the function above noted, the tabs tend to cause a more smooth flow of air past the tail surfaces of the plane.

The particular structure and arrangement shown and described illustrate the principles of the invention but it is to be understood that the particular description is merely illustrative and that numerous variations and other embodiments may be developed without departing from the principles of the invention.

I claim:

1. In an aeroplane, a wing structure having a center flap beneath the fuselage pivoted to flex downward to increase the camber of the lower wing surface and side flaps on either side thereof also pivoted to flex downward to increase the camber of the lower wing surface and movable independently of the first mentioned flap, together with means for flexing the flaps downward at different relative angles, said means connected to first move the side flaps downward and then the center flap downward.

2. In an aeroplane, a wing structure having a center flap beneath the fuselage pivoted to flex downward to increase the camber of the lower wing surface and side flaps on either side thereof also pivoted to flex downward to increase the camber of the lower wing surface and movable independently of the first mentioned flap, means for flexing the flaps downward comprising an arm operatively connected to a side flap and a slotted link connection between the arm and a center flap.

3. In an aeroplane a fuselage, a wing structure continuous beneath the fuselage having a flap extending along its trailing edge beneath the fuselage and pivoted to flex downward, a tab connected to the trailing edge of said flap having its forward edge spaced from the trailing edge of the flap and arranged to be moved angularly relative to the plane of the flap when the flap is moved downward, substantially as described.

4. In an aeroplane, a wing structure having a center flap beneath the fuselage pivoted to flex downward to increase the camber of the lower wing surface and side flaps on either side thereof also pivoted to flex downward to increase the camber of the lower wing surface and movable independently of the first mentioned flap, means for flexing an arm connected to said side flaps to flex the same downward, an arm connected to said center flap to flex the same downward and locking and connecting means between said arms holding the second mentioned arm in fixed position to hold the center flap in uppermost position during the first part of the flap flexing movement of the first mentioned arm and connecting the two arms to move together during the second part of the flap flexing movement of said first arm, substantially as described.

5. In an airplane a wing structure having a center flap beneath the fuselage pivoted to flex downward to increase the camber of the lower wing surface and side flaps on either side thereof also pivoted to flex downward to increase the camber of the lower wing surface, and means for flexing all of said flaps downward while contemporaneously applying differential motion to certain of said flaps, said means comprising a plurality of independent torque tubes extending parallel to said flaps, means operatively connecting said flaps to said tubes for flexing said flaps upon rotation of the tubes, arms connected to the tubes, a link pivoted to one of said arms, a pin-and-slot lost-motion operating connection between the link and the arm connected to another tube and means for rotating one of said tubes, whereby a flap associated with one of said tubes is flexed downward in advance of a flap associated with another of said tubes.

ALEXANDER P. DE SEVERSKY.